United States Patent [19]
Stapleton et al.

[11] Patent Number: 5,922,604
[45] Date of Patent: Jul. 13, 1999

[54] THIN REACTION CHAMBERS FOR CONTAINING AND HANDLING LIQUID MICROVOLUMES

[75] Inventors: Marilyn Stapleton, Durham; William Harrington, Hillsborough, both of N.C.

[73] Assignee: Gene Tec Corporation, Durham, N.C.

[21] Appl. No.: 08/869,491

[22] Filed: Jun. 5, 1997

[51] Int. Cl.$^6$ .............................. G01N 1/18; G01N 21/05
[52] U.S. Cl. ........................... 436/46; 422/102; 422/103; 435/288.5
[58] Field of Search ............................... 422/99, 102–104, 422/58, 61, 100, 101; 435/286.1, 286.5, 288.5; 436/45–47

[56] References Cited

U.S. PATENT DOCUMENTS

| | | | |
|---|---|---|---|
| 5,135,719 | 8/1992 | Hillman et al. | 422/58 |
| 5,225,163 | 7/1993 | Andrews | 422/61 |
| 5,346,672 | 9/1994 | Stapleton et al. | 422/102 |
| 5,371,212 | 12/1994 | Gavin et al. | 422/58 |
| 5,635,358 | 6/1997 | Wilding et al. | 422/58 |

*Primary Examiner*—Lyle A. Alexander

[57] ABSTRACT

The invention is an apparatus and a process for containing and handling liquids in a thin capillary space. Two opposing walls positioned at a first and a second distance apart define a thin space having at least two different heights and two different regions of capillary liquid attraction. Enclosing the thin space with side walls defines a reaction chamber. A liquid receiving area, entry and exit ports and features projecting from, or encircling, at least one wall allow coatings on the internal surface of either of the two opposing walls to react with multiple microvolumes of reagents and wash treatments in series. Liquids flow into, or are withdrawn from, the thin space in a way in which bubbles are not introduced into the thin space. Bubbles that may arise in the thin space move along a sloped feature out of the thin space into an annular enclosure. The liquids are withdrawn after reacting with the coatings, either to empty the chamber and recover the liquid volume, or to wash the coatings with treatment liquids and introduce new treatment liquids. The ability to control liquid movement in spaces thin enough to exhibit capillarity is useful for analyzing biological specimens cost-effectively with less reagent volume and more information per specimen and without sacrificing convenience in liquid handling or surface reaction space.

20 Claims, 2 Drawing Sheets

THIN REACTION CHAMBERS FOR CONTAINING AND HANDLING LIQUID MICROVOLUMES

This invention was made with government support under GM 47178 awarded by the National Institutes of Health. The government has certain rights in the invention.

FIELD OF THE INVENTION

The invention pertains to the field of devices for processing micro-samples and microvolumes of reagents, in particular to reaction chamber devices for detecting nucleic acid sequences and other molecular markers for diagnostic purposes. It is well known that sequence specificity in nucleic acid detection methods enables discrimination between sequences down to single base differences for diagnostic purposes and the conditions affecting binding or electrophoresis of the nucleic acids are important to the specificity of the reaction. If any reaction conditions vary, the results could be inconsistent with previous assays or with results of the control and calibration reactions. A device which provides uniform conditions for a series of different reagent treatments is useful in many processes and particularly useful in gene amplification and detection processes.

Either because the biological specimen is small or because larger reaction volumes are more costly or slower to complete reactions, it is desirable to minimize processing space. Other considerations for biochemical reactions are avoiding evaporation of aqueous reagents, minimizing sample handling and processing steps and making detection signals accessible for interpretation. For example, positioning multiple probes, each probe immobilized on a planar surface in a known location in an array and each probe representing whether a particular genetic sequence is present in a specimen, provides more diagnostic information from each reaction. A reaction chamber contained in a thin space has relatively little distance between opposite surfaces and this spatial configuration minimizes volume and maintains a surface area for positioning a microprobe array.

BACKGROUND OF THE INVENTION

The device of the invention addresses miniaturization of reaction chambers for the purpose of using smaller quantities of sample and reagents. Smaller chambers often require a working surface area and means to prevent evaporation of the small volume of reagents, either due to elevated temperatures or prolonged reaction periods. Covering a working surface area by stretching out a small liquid volume results in a generally planar chamber, as opposed to commonly used U-shaped, or V-shaped cuvettes. The ratio of working surface area to volume is significantly increased when the reaction area is stretched out, but so is the surface area available for evaporation at the interface between the aqueous-based reagent liquids and air. Covers and seals over the liquid flow path of complex reactions may be more critical than those used in immunodiagnostic test strips, where evaporation does not affect test results because reaction times are usually quite rapid.

Reaction devices are described in U.S. Pat. Nos. 5,346,672; 5,188,963 and 5,451,500, which patents are herein incorporated by reference. One device controls evaporation by sealing a cover to a microscope slide. The others are method and apparatus inventions that integrate the sample preparation and detection of nucleic acids in biological specimens by flowing a series of reagents and washes over a thin matrix or through a thin chamber.

It is well known in the field of molecular biology that the more sensitive is the method of molecular detection, the fewer number of copies of the molecular target are needed for detection. The need to amplify either the target sequence or the signal arises when the specimen material does not contain enough molecules to detect above a complex genetic background or when analyzing the fine sequence detail of a nucleic acid sequence. U.S. Pat. No. 5,382,511, herein incorporated by reference, uses enzymes such as polymerase or ligase, separately or in combination, to repeatedly generate more copies of a target nucleic acid sequence from immobilized samples by primer extensions to incorporate new nucleotides or by ligations of adjacent complementary oligonucleotides, wherein each template generates more copies and the copies may themselves become template. By melting complementary strands of nucleic acids, the original strand and each new strand synthesized are potential templates for repeated primer annealing or ligation reactions to make and expand the number of specific, amplified products. More thermostable ligases and polymerases with reverse transcriptase activity are commercially available and increase the choice of enzymes and combination of reactions for immobilized sample amplification applications. Immobilized Sample Amplification, ISA, can either be primer extensions in one direction for linear amplification, or in opposing directions, for geometric amplification, and the like, when replicas are generated from a target within the immobilized biological specimen.

Although the applicant first achieved Immobilized Sample Amplification in a chamber made by sealing two glass cover slips together with rubber cement; the technique using rubber cement or nail polish is messy, labor-intensive and prone to failure during thermocycling. The Gene Cone chamber (U.S. Pat. No. 5,346,672, GeneTec Corporation, Durham, N.C.) was invented by the applicant and injection-molded as a plastic part that is adhered to a glass slide to form a reaction chamber; the plastic part has an opening for adding reagents to the chamber and then the opening is closed. Another thin chamber, the Amplicover is made by pressing a flat molded part against a glass slide by a spring clamping mechanism after the reagent is added to the specimen on the slide (In Situ System 1000, Perkin-Elmer, Norwalk, Conn.). Reagents spill out at the edges of the Amplicover before a gasket-like seal is formed by the clamp. The Gene Cone chamber, unlike the Amplicover, has a port to allow for removal and addition of subsequent reagents and wash treatments. However, it is difficult to dispense into a Gene Cone chamber without touching its surface and it is not practical to remove liquid from its thin spaces.

One way to miniaturize reactions is to make wells smaller and closer together; however it becomes more difficult to insure that only the reagent or sample intended for each well is delivered to it. Another way to miniaturize reactions is to increase the number of tests per reaction volume by localizing different tests in an array with a capability to discriminate individual signals from each component of the array. Thus, an positional array with 100 components generates 100 signals in the same volume that previously generated a single signal and effectively reduces the volume of reagent required per test 100-fold.

Attempts to miniaturize reaction chambers are confronted with the problem of how to introduce liquids into, or remove them from, reaction chambers that comprise thin spaces and, in particular, how to keep the working area liquid-covered and bubble-free. Among the factors causing bubbles to arise in liquids are irregular flow patterns, temperature and pressure changes and gaseous discharge at electrodes. It is well known that evacuating liquids and removing bubbles from a thin space is difficult. Filling and moving fluids in spaces thin enough to exhibit capillarity often are not predictable by standard engineering fluid dynamics.

SUMMARY OF THE INVENTION

In a broad aspect, the invention comprises an apparatus and process for containing a liquid volume and features which act to control the fluid flow of liquid volumes within a thin capillary space. A capillary space is a space in which the liquids in contact with the solid boundaries of the space are affected by repulsive and attractive forces resulting from adhesion, cohesion and surface tension in the liquids. An opposing wall is the boundary of a space between it and another wall positioned opposite it. The distance between them is the height of the space. The apparatus for holding liquids in a thin space comprises at least two heights between two opposing walls, one height at a first distance and another height at a second distance, in order to cause capillary liquid attraction between the two opposing walls to be stronger at the first distance than the second distance. A liquid receiving area communicates with the space enclosed between the two opposing walls. Liquids in the liquid receiving area flow first into the space between two opposing walls having the stronger capillary attraction and then flow into and fill the space between two opposing walls having the a weaker capillary attraction. Capillary liquid attraction is generally stronger in a thinner space. The apparatus further comprises a feature on at least one of the two opposing walls that forms a channel between them to direct flow into the thin space. The thin capillary space may be further enclosed by side walls, forming a thin chamber, and having entry and exit apertures, or ports.

Named features are described which enable reagents to be serially added to, and removed from, the working space. Samples or reagents are coated or immobilized on internal surfaces of the chamber walls. The invention is used to contain a sample during biochemical and molecular reactions and allows a first microvolume of a first reagent to be added and then displaced by a second reagent or wash. The invention minimizes evaporative loss of reagents during reactions. During heating and cooling to rapidly bring sample reactants to higher or lower predetermined reaction temperatures, the apparatus further comprises closure mechanisms for the entry and exit ports and features to minimize air bubbles in the working area. Optionally, the apparatus comprises other means which may be necessary to either passively or actively control temperature or interpret the results of the reaction. The present invention overcomes the limitations and drawbacks described above relating to thin reaction chambers.

We discovered features by experimentation that match fluid properties in order to control the flow of fluids in thin spaces. The properties in the field of fluid mechanics that were considered in designing these features include, but are not limited to, the interrelationships between capillarity, surface tensions, frictional factors, static head, laminar and turbulent flow in small cross-sectional circular and noncircular conduits, interfaces between different fluids (i. e., air and liquid), vapor pressure, density and viscosity. The apparatus has several distinct and separate features of planar and curved surfaces forming a thin reaction chamber that accomplish different aspects of fluid flow and processing. In a first aspect, a feature enables uniform filling of the chamber with liquid without physically contacting a liquid dispensing device to the chamber. A second aspect defines a working space of a thin chamber covered with liquid in preference to other areas of the chamber. A third aspect is a feature causing liquids to flow into the chamber without entrapping air. A fourth aspect is a combination of features that enables extracting nearly all of the liquid residing in the thin chamber in order to empty the chamber. A fifth aspect uses combinations of features to move liquids across a defined working surface area in order to introduce reagents to, or wash them away from, the working surface area. A sixth aspect uses the features to causes air bubbles arising in the liquid to move out of the working space.

The invention disclosed herein controls filling of, and fluid flow through, reaction chambers of a generally thin shape without forceful injection and without air entrapment. Accordingly, the invention aims to provide an improved device designed to reduce reagent volume while keeping one or more coated surface areas covered with liquid reagent. The coating in the working surface area may be comprised of a small amount of biological specimen, immobilized analytes and the like. The invention allows reagents to be easily added and washed away from the working surface area with automated liquid handling equipment for high throughput screening. One advantage of the device of the invention is to conveniently combine several steps into one easily automated format in order that the sample may be totally processed in one reaction chamber and not transferred to other vessels. The larger surface area to volume ratio of a generally thin reaction chamber is particularly adapted to the interpretation of positional signals such as cellular markers of a biological specimen or an array of nucleic acid sequences as a means to analyze genes or gene expression. A large liquid surface-to-volume ratio also provides an advantage in heating and controlling the temperature of the contents of a thin chamber because energy transfer from one heated wall to the other wall is rapid due to the relatively short length of the thermal path across chamber liquid.

Since the invention facilitates washing, it is means for introducing a series of microvolumes of reagents to the working surface areas. Another distinguishing feature is that each reaction chamber of a multiple assembly may be selected to receive a different series of reagents, and each reagent volume will be unique from, and not commingled with, reagent volumes of other chambers. The invention may be used either manually with simple, hand-held pipetting means or with an automated control system providing a power source and microprocessor, either contained internally, or available through electrical, electromagnetic, electrochemical or optical connections.

Other objects and advantages of the invention will be more fully apparent from the ensuing disclosure and appended claims. In the drawings, height dimensions are exaggerated for illustrative purposes and are not meant to be proportional nor drawn to scale.

DETAILED DESCRIPTION OF THE INVENTION AND PREFERRED EMBODIMENTS THEREOF

Figure 1:
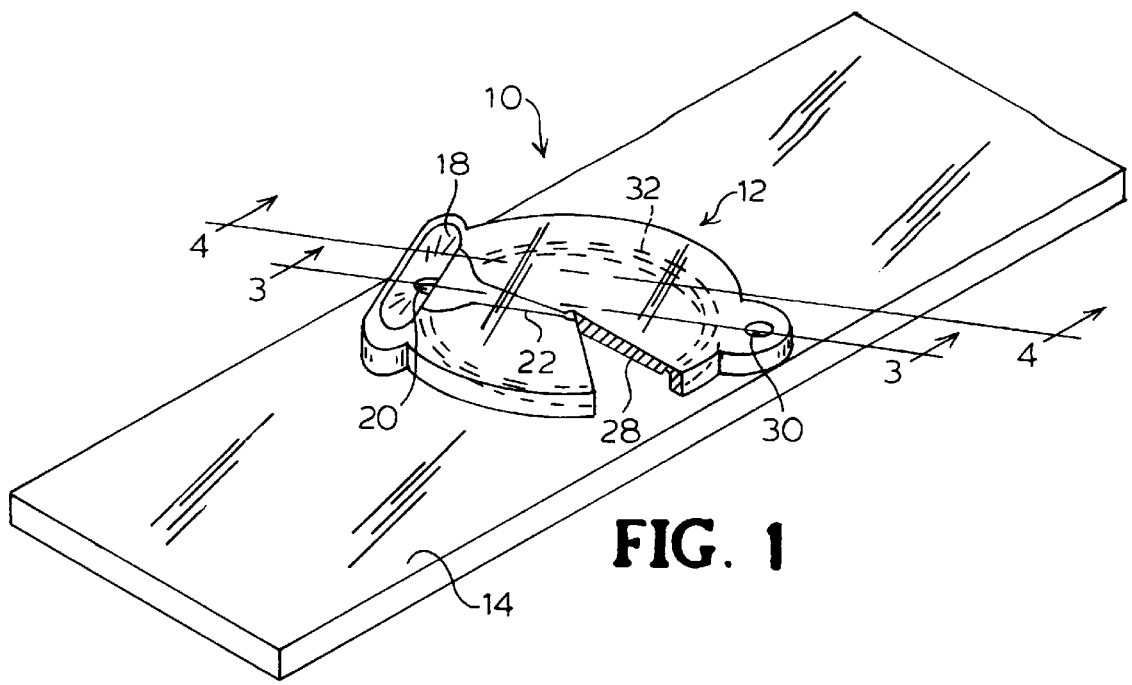
FIG. 1 is a perspective view of an embodiment of the device of the invention showing a clear cover affixed to a base. The beam and ring features are viewed through the top of the clear cover and a cut away shows the sloped feature and arc of the annular ring.
Figure 2:
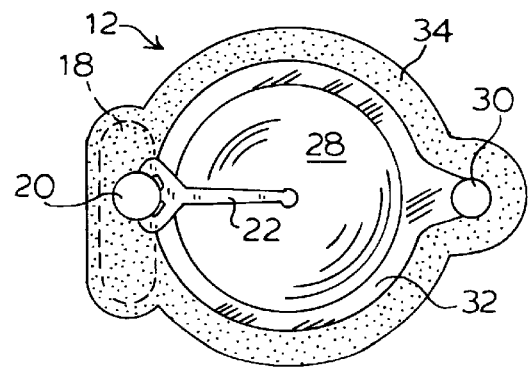
FIG. 2 is a bottom planar view of the cover illustrated in FIG. 1.

The invention comprises an internal space of a shape that is generally thinner, rather than spherical or cuboidal, wherein biochemical reactants are brought into contact with a sample. A preferred height of the thin space between two opposing walls is a distance in the range of 20 microns to 2 millimeters, but actual and relative dimensions may be optimized for a particular liquid and/or experimental procedure by a person skilled in the art of miniaturizing parts. A preferred chamber has at least one working surface area coated with sample reactants to react with liquids in the internal thin space; the working surface area having dimensions in the range of 0.01 to 1 square centimeter. In one embodiment of the reaction chamber, the coating is a biological specimen immobilized on the working surface area, preferably a monolayer of cells in the range of 100 to 100,000 cells, and could be as few as twenty or less cells. The number of cells in the sample depends upon whether the target nucleic acid sequences occur commonly or rarely in a cell population. Amplification that increases either the number of target copies or the amplitude of the signal, enables rare events to be detected. The specimen area surface needed for a few cells could be in the range of less than 100 square microns and the volume of reagents could be in the range of a few picoliters; however the actual volume selected is what is practical to measure and handle. In cases where the target is expected to be a rare event, the specimen holding area of the reaction chamber may be accordingly increased upwards to around 25 microliters of reagents for thousands of cells. It is known in the art that drying a solution of cells onto surfaces generally affixes the cells in a monolayer, if the cells are not too concentrated in the solution. Tissues that are cut into 4–10 micron thick sections are either nearly a monolayer or at most a few cells thick. The monolayer-like arrangement of immobilized cells allows accessible diffusion of reagents.

In another embodiment of the reaction chamber, the coating is a microprobe array immobilized on the working surface area, preferably in the range of 4 to 50,000 probes positioned in the array and spaced in the range of a few microns to a few millimeters apart. At least one of two opposing walls is preferably coated before the two opposing walls are sealed together to form a thin chamber. The opposing walls are comprised of similar or dissimilar material, such as glass, plastic or silicon. It is clear that the apparatus may embody one or more of the features on a single wall and be delivered to end users to affix opposite another wall of their own choosing. Sealing means include adhesive and clamping mechanisms, and are selected on the basis of the materials comprising each one of the two opposing walls. A chamber having a one square centimeter working surface area and a depth of 0.1 to 0.5 millimeter has a volume in the range of 10–50 microliters which is desirable in conserving reagents and practical for liquid dispensing equipment currently available. The size of the reaction chamber depends upon the requirements of the working surface area occupying the working area, the reaction volume needed in order to provide sufficient reactants so as to not limit activity, and the sophistication of the equipment used for measuring and dispensing.

The invention broadly comprises a microfluidic flow system comprising a reaction chamber device 10, boundaried by planar and curved internal surfaces designed to control fluid flow in the reaction chamber. In the embodiment described in FIG. 1, features belonging to a cover 12, when the cover is affixed to a flat base 14 such as a glass slide, enable the desired control of microfluidic flow in the chamber 16 formed thereof. It is clear that either one or both of the opposing surfaces of the cover 12 and the base 14 may comprise any of the features with the understanding that the liquid receiving area 18 and entry port 20 would be positioned generally below a liquid dispensing device to receive liquids.

A first aspect of the invention comprises using the liquid receiving area 18 and entry port 20 to enable liquid to fill the chamber 16 without entrapping air and without physical contact between the liquid dispenser and the chamber 16. The liquid receiving area 18 will be a size adequate to receive a liquid volume. Liquid droplets from a dispensing tip fall onto a sloped wall of, and collect in, the liquid receiving area because the entry port 20 and the thin space retard liquid flow. A beam 22 is a feature projecting from at least one of the two opposing walls that creates a thinner space, or channel 24, directing flow from the liquid receiving area into the thinner capillary space. Dispensed microvolumes normally fill the liquid receiving area 18 faster than capillary flow moves liquids into the reaction chamber; therefore, a temporary pressure head is generated in the liquid receiving area 18. The liquid receiving area 18 for dispensed fluids is also shaped to minimize splashing and the chance of creating an air lock in the inlet. In our experience an orifice wide enough for a portion of the drop to communicate with the capillary space adjacent to the entry port 20 keeps air from entering the thin chamber. The liquid receiving area 18 may be covered with a cover that is tripped open only when a dispenser is positioned to dispense a fluid into the entry port 20. In this manner, or similar means, the integrity of the reaction chamber is maintained.

The process of the invention provides a space enclosed between two opposing walls having at least two heights, one a first distance and another a second distance to cause capillary liquid attraction between the two opposing walls to be stronger at said first distance than at the second distance. Capillary attraction is thought to be the primary mechanism to fill the reaction chamber, initially replacing the air in the chamber. Capillary attraction is well-known in filling a thin space between two surfaces, but this invention purposely generates a capillary space in which the two opposing planar surfaces are not parallel, in order to use differential capillary attraction forces to control fluid flow into and through a thin capillary space. The beam 22 creates a narrow channel 24 to direct flow into the chamber because of its greater capillary attraction for the liquid than in the remaining portion of the chamber; so liquid from the liquid receiving area 18 fills the channel 24 first. Fingers of the beam 22 encircle the entry port 20 in order that all of the liquid enters the chamber 16 through spaces having strong capillary attraction. Other features that are alternatives to the beam 22 are those which create thin capillary spaces such as fibrous matrix materials. A fibrous matrix is positioned in the same general configuration as the beam 22 and the thin spaces between the fibers interface and connect with one another, representing many channels serving the same function as channel 24. Capillary attraction in the interfacing capillary channels wicks the liquid from the liquid receiving area through many thin channels 24 of a matrix, directing flow into the working area 26 and keeping coatings liquid-covered.

Liquid droplets from a dispensing tip may comprise any volume that will not overflow the liquid receiving area 18. The liquid droplets may be pulsed, or dropped from a distance in the range of 0.5 to 2 centimeters above the liquid receiving area 18, depending upon the viscosity of the liquid. The importance of non-contact dispensing is the elimination of changing or washing dispensing tips between chambers to avoid cross contamination between samples. Savings in dispensing time are realized as well as eliminating the cost of disposable tips.

Figure 3:
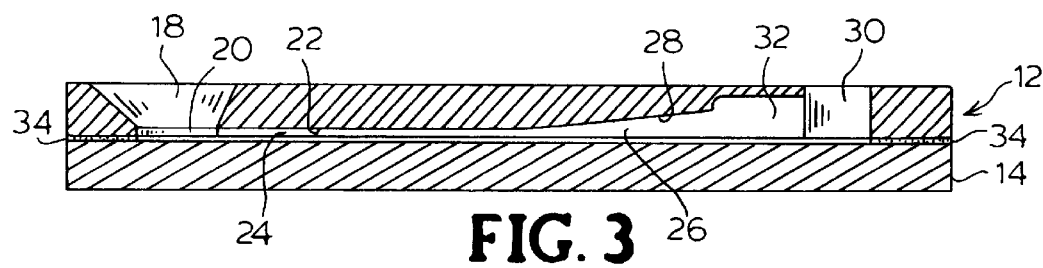
FIG. 3 is a cross-sectional view through line 3 of FIG. 1.
Figure 4:
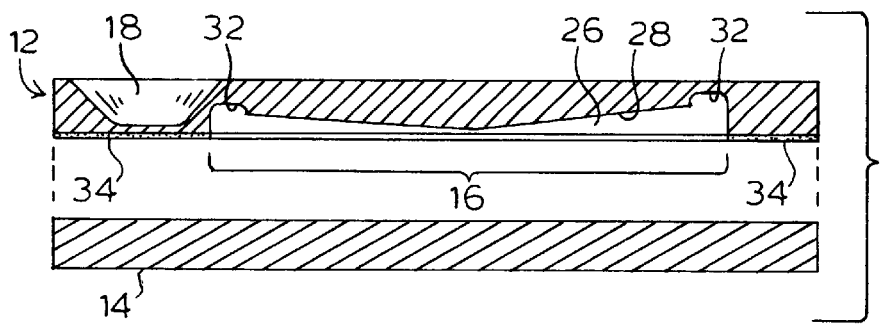
FIG. 4 is a cross-sectional view through line 4 of FIG. 1.

A second aspect is a feature to fill a defined working area 26 with liquid in preference to other areas of the chamber 16. This embodiment of the apparatus comprises a sloped feature projecting from the surface of at least one of said two opposing walls, the projection is selected from a group consisting of a cone, a pyramid, a parabola and combinations thereof, and gradually increases in height from the base of the projection towards its apex, forming a thin capillary space between two opposing walls, wherein said thin capillary space gradually increases in height from the apical region of the sloped feature and towards its base region. The degree of slope of the sloped feature is subtle and may be linear, stepped or curved in form. The apical region of said sloped feature is at a height of a first distance between the opposing walls and defines a thinner space with stronger capillary attraction than the regions progressing towards the intersection of the projection's base and the wall which have successively greater distances and weaker capillary liquid attraction. Liquids flow into a space between said two opposing walls, preferentially and progressively filling the space from a region of stronger capillary attraction to a region of weaker capillary attraction. In FIGS. 3 and 4, a cone 28 portion of the cover 12 forms a thinner space in the chamber 16 at its apex than at its base. The liquid preferentially fills the central working space 26 and then fills the working space 26 concentrically outward from the apex of the cone 28.

A third aspect is a feature causing liquids to flow into the chamber without entrapping air. If any portion of the leading edge of the liquid flows faster and reaches the exit port 30 before another portion, flow ceases because liquid cannot displace air if the flow of exiting air is blocked by liquid. An annular enclosure, or ring 32, encircles the working area 26 in this embodiment. The height and width of the ring 32 is selected relative to the height of the working area 26 such that capillary attraction is greater in the working area 26 which fills before the ring 32. The height of the ring 32 increases slightly from fluid entry to exit, further retarding flow as capillary attraction lessens and insuring that the working area 26 is filled before flow in the ring 32 reaches the exit port 30. The area surrounding the exit port 30 has the greatest height and the walls of the exit port 30 itself are designed to minimize capillary attraction and avoid creating a narrow channel that could draw in liquids and be a barrier to escaping air. The increase in depth of the ring 32 is illustrated in the cross-sectional view of FIG. 4.

A fourth aspect is using the features to extract the residing liquid from a thin chamber. Non-parallel spacing between the two opposing walls creates differential forces of capillary attraction and repulsion of liquid in the ring 32, working area 26, and channel 24, all of which are used to fill the thin chamber uniformly. A liquid removing device such as a transfer pipette is used to make fluid communication between the liquid removing device and liquid residing in the channel to withdraw liquid. Applying light suction with a liquid removing device at the entry port 20 withdraws all of the liquid except a moist film wetting the internal surfaces, thereby effectively emptying the chamber. It is therefore possible to reverse the flow of liquid by using the strong capillary attraction in the channel 24, created by the beam 22, to extract liquid through the entry port 20 with a liquid removing device such as a pipette. As liquid is aspirated into the pipette tip from the channel 24; liquid residing in the region of thin working space 26 retreats into the channel 24. Similarly, as the liquid is extracted from the thin working space 26, liquid residing in the ring 32 retreats to the thin working space 26, and so on until the chamber is emptied of a liquid volume. If liquid withdrawal is interrupted by a break in liquid communication, it can easily be reestablished by introducing just enough liquid to bridge the break in fluid communication and again apply suction. This mechanism serves the purpose of recovering the liquid reactant when it is desirable to extract it, as may be needed to add or recover liquid without the diluting effect of washing liquids through the chamber. It is clear that the design utilizes improved means to extract liquid from a thin chamber with less force and more control than other means, such as using an air stream from a compressed air source to force, or blow, the resident liquid out of the chamber.

A fifth aspect of the embodiment of the invention moves liquids over the relatively large surface areas of the working space 26 in order to introduce or wash away liquids containing reagents interacting with the coatings containing reactants which are immobilized on either of the two opposing surfaces of the working space 26. New reagents and washes are dispensed by filling the liquid receiving area 18 and withdrawing some resident volume at the exit port 30. When the resident liquid is withdrawn through the exit port 30, liquid in the liquid receiving area 18 flows into and mixes with liquid in the chamber 16, progressively diluting a first liquid in the chamber 16 with each repeated addition of a second liquid. Three washes, each one a volume equivalent to the resident volume, is generally adequate to wash away interfering material and prepare the coatings for another treatment.

The importance of the washing mechanism is that no fluids commingle between chambers and the exit port may be aspirated without entering any internal space of the chamber. While a suctioning device, as simple as a plastic transfer pipette, needs to make contact with the area surrounding the exit port 30, it does not enter the exit port itself. In automated systems, a low pressure vacuum line is sufficient. In washing procedures it does not matter whether suctioning is done before, during or after the liquid receiving area 18 is filled. The process is a simple way to effectively change liquids in a thin chamber and one that can be easily automated. The liquid receiving area 18 provides enough gravitational force in its pressure head to overcome the surface tension of the leading edge of the first, moving aqueous fluid that replaces air in the empty chamber.

An alternative to aspiration is using gravitational drip to replace the resident fluid volume. In this variation the exit port 30 opens downward. When the chamber is liquid-filled, a pressure head created by liquid in the liquid receiving area 18 will overcome flow inertia at the exit port 30. A resident volume is maintained by capillary attraction, but when liquid in the liquid receiving area 18 forms a pressure head, liquid collects as a hanging drop in the exit port 30 until surface tension is overcome and the drop falls. A waste trough or absorbent material below the exit port 30 and out of liquid communication with the liquid in the chamber would simplify collecting the spent liquids inasmuch as no contact and no aspiration for fluid flow are required. It is expected that the exit port 30 will possess means for breaking fluid communication between fluids previously resident in the reaction chamber and the current resident volume in the reaction chamber in order to prevent back-diffusion of any waste reaction components. A check valve between the reaction chamber and the waste area is one possible means to separate fluids in the waste area from fluids in the reaction chamber and prevent back flow into the reaction chamber. In the event that absorbent material is positioned in a waste area for convenience in storing and removing waste fluids, it will be located a sufficient distance from the outlet valve so that the absorbent material will not siphon liquids from the reaction chamber.

Although liquids in the embodiments disclosed herein generally flow in a horizontal plane, other embodiments were tested to demonstrate that capillary attraction in thin chambers is strong enough for fluids to flow against gravity. Capillary flow uphill in the thin chamber was more uniform in filling than flow assisted by gravity because the leading edge of a faster flow tends to be more irregular and leading edges can join around a lagging edge to encircle air voids. In embodiments in which the plane of the chamber is designed for more vertical flow, it is expected that the entry port 20 is below the horizontal plane of the exit port 30 and the liquid receiving area 18 is rotated accordingly to easily receive liquid droplets.

Liquid dispensing may be performed manually or with automated equipment. Air bubbles that may be present in liquid reagents filling the liquid receiving area 18 do not enter the chamber 16, since the liquid of the liquid receiving area contacts and flows into the capillary space of channel 24 without introducing air. The design overcomes the problem of bubbles from dispensing lines entering the chamber, as may occur with forced injection. When dispensing is done manually, a technician is cautioned against inserting the pipette tip into the entry port 20 because air in the tip may be forced into the channel 24. Another advantage in filling without pressure lies in the fact that because no contact is necessary at the entry ports 20, no contaminants can be picked up by touching and carried from one chamber 16 and introduced into another.

A sixth aspect is a design mechanism that causes air arising in the liquid to move out of the working surface area. Air-filled, liquid voids are known to be detrimental in many processes where interactions are taking place on surfaces. Bubbles are a problem in lubricants which are being used to avoid friction between surfaces. Lack of reactant availability due to a bubble may prevent a reaction from taking place and lead to a false interpretation. For example, artifacts in the staining of immobilized cells may result in a false positive interpretation. A bubble over a portion of a probe array where there should have been a signal may result in a false negative interpretation. Reproducible results depend upon uniform liquid coverage on surfaces with immobilized reactants.

In our experience, bubbles large enough to span the space between two opposing surfaces less than 2 millimeters apart, tend to resist being dislodged even in a vertical plane; whereas very small bubbles or bubbles in a larger space tend to rise vertically to the surface of the liquid. The design features that keep bubbles out of the working area 26 of chambers, having spaces generally thinner than 2 millimeters, comprise the channel 24, and the spaces defined by the cone 28 and the ring 32. It is known that minor perturbations on surfaces are also responsible for generating bubbles in a fluid path and therefore the internal surfaces of the chamber 16 are made as smooth as possible. Changes in temperature and pressure affect fluid flow. When a liquid is heated, dissolved gases expand and tiny bubbles arise. As temperature increases the bubbles arising in the working area 26 will expand. If then, temperature is lowered, so is the capacity of the liquid to absorb dissolved gases.

The ring 32 is designed to be a buffer zone for fluidic perturbations created by dynamic temperature and pressure changes. Bubbles evacuate the working area 26 by moving along the sloping height of the inverted cone 28, escaping from the working area 26 to the ring 32. During thermocycling air spaces in the ring 32 continue to expand and contract with each cycle. The curvature of the surface blending the cone 28 with the ring 32, and the height of the outer edge of working area 26 and the height and width of the ring 32 are designed relative to each other so that air expands in two directions along the arc of the ring 32 rather than concentrically outward from the air space, thereby preventing the intrusion of air into the working area 26. The radius of the curve that defines where the cone 28 ends and the ring 32 begins must be small enough that the capillary attraction at the outer edge of the working area 26 is stronger than that of the ring 32 in order to keep liquid preferentially covering all of the working area 26. In our laboratory, observations and experiments testing design features for thermocycling in the flow chambers, confirmed that new small bubbles coalesced and formed larger ones during the first few heating cycles, bubbles expanded and entered the ring 32, but fewer or no new ones formed in the working area 26 during more cycles of themocycling. Reagents with higher water content were more prone to more bubble formation at temperatures approaching the boiling point of water due to the sharp rise in vapor pressure.

A number of separate covers were molded to form a chamber having a volume circa 0.085 milliliters, diameter of 1.5 centimeters and height from 0.01 centimeters in the channel 24, rising at a gradual slope to a height of 0.05 centimeters in the ring 32, with respect to the plane of the opposing wall. One or two of these chambers were affixed to a 25 millimeter by 75 millimeter glass slide by a seal 34 made of an adhesive material. A variety of different reversible and permanent adhesive materials were evaluated and selected on the basis of binding strength to each of the two opposing walls, biocompatibility and the expected chemical and temperature exposure. Materials included, but are not limited to, epoxy, UV-cured polymers, cyanoacrylates, double-sided adhesive transfer tapes comprising silicon, rubber or acrylic. Thicker laminating material will increase the depth and volume of the chamber.

In yet another embodiment, a single base 14 supported more than one chamber cover 12. Each reaction chamber has its own entry and exit port, but were molded together for the purpose of making handling and processing more convenient. A frame (not shown) constructed to position several devices 10 in an assembly is envisioned to locate entry ports of reaction chambers at defined positions on an X-Y-Z axis for automated dispensing. Drawings were generated for both three and four chamber slides with the entry and exit ports spaced to fit the same 9 millimeter that is standard for the dispensing probes configured for 96 well microplates. Molds were tooled so that four reaction chambers were jointly fabricated to fit a standard microscope.

EXAMPLE 1

Figure 5:
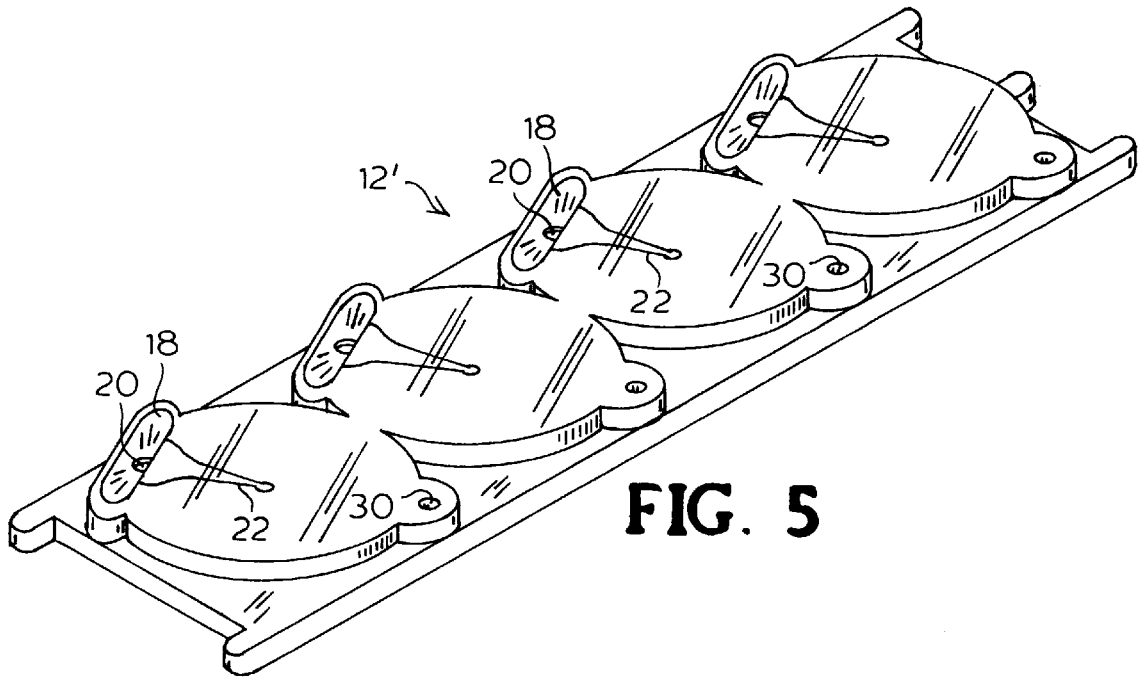
FIG. 5 is a perspective view of a four chamber embodiment of the invention.

A preferred embodiment was made by first generating a CAD drawing of four chambers sized to fit on a 25 mm×75 mm glass slide, as the one shown in FIG. 5, based on several prototypes having design features that had previously been tested, and then programming a CNC machine to a cut a negative pattern of the design into two aluminum blocks with registration to each other. The measurements of the molded part are as follows: liquid receiving area, 3×9 millimeter oblong opening tapering downward to a 3 millimeter entry port opening; circular working space, 12 millimeter diameter, height increases from 102 microns at the channel and flattened apex of the conical projection to 305 microns at its outer edge with respect to its distance from the plane of the surface of the glass slide when adjoined by a 127 micron thick adhesive; the beam and channel, 813 microns wide, having three prongs in communication with the entry port joining together and tapering at the apical area to 305 microns wide; a ring encircling the working area having a cross-sectional width of 635 microns and height [with respect to the distance from the plane of the surface of the glass slide when so adjoined] of 305 microns near the entry port, gradually increasing to 940 microns as it merges into the exit port. The exact dimensions are less critical in determining function than are the measurements relative to each other. The entry and exit ports were drilled openings of 3 and 1.6 millimeter diameters, respectively.

Two-millimeter thick plaques of either polycarbonate (Lexan, General Electric) or polymethylpentene, TPX-MX002 (Mitsui Plastics, White Plains, N.Y.) were compressed between the two halves of the aluminum mold under heat and pressure. After the mold cooled gradually, the two halves of the aluminum mold were separated and the molded part retrieved and trimmed. Two double-sided adhesives, #7876 (Adhesive Research Inc., Glen Rock, Pa.) and #443PC (3M, St. Paul, Minn.) were layered together between liners and cut according to an adhesive pattern matching the outer edges of the chamber space. The layered adhesive pattern was positioned in one half of the aluminum mold, the liner of the 443PC was removed and using the other half of the mold to position the plastic part on the adhesive, the adhesive was bonded to the plastic part. The plastic part and affixed adhesive were stored until use, at which time the liner on AR 7876 was removed and the plastic part affixed to a glass slide containing four specimens or microprobe arrays in the working area of the chamber therein formed. Both plastics were optically clear and useful for processing and viewing results.

The following test was performed in a chamber made according to the description of the preceding paragraph in order to determine whether any discontinuities could be observed on the working surface area due to the pattern of flow during reagent additions and washing. A hybridization reaction was performed in the chambers to compare staining of cultured horse dermal and human lymphoid cell populations, mixed 5:1, which were immobilized and dried onto the working surface area of a microscope slide before the plastic cover was affixed. The cells were protease-digested with 1 mg/ml Proteinase K for 15 minutes at 25° C., soaked in 0.1 M glycine in phosphate-buffered saline and incubated in 0.25% acetic anhydride in 1 M triethanolamine for 20 minutes at room temperature. After rinsing with water, the cells were dehydrated in ethanol and air-dried. A 4-chamber cover was affixed to the slide to form a hybridization chamber. Hybridization buffer (Sigma Chemical, St. Louis, Mo.) was added to the chambers to cover the mixed cell spots in the working area of each chamber for prehybridization. Next, a biotinylated human Alu oligonucleotide probe sequence was hybridized overnight in the chamber at 37° C. in Sigma hyb buffer. The cells were washed with three chamber volumes of SignaSure buffer (Enzo Diagnostics, Farmingdale, N.Y.), blocked with normal sheep serum, incubated for 1 hour with strepavidin-alkaline phosphatase conjugate (Boehringer Mannheim, Indianapolis, Ind.)and detected after adding and removing three washes each of SignaSure buffer, detection buffer and Boehringer Mannheim's BCIP and NBT substrates. Positively-stained cells represented the ratio of human cells to unstained horse cells. There was no evidence of discontinuity in the staining pattern of cells in the working area caused by bubbles, uneven flow patterns or incomplete washing in the thin chamber.

EXAMPLE 2

Another embodiment of the cover (not shown) was made of two separate parts. One part was machined from chemically-resistant polyetheretherketone (PEEK, Victrex USA, Inc., Westchester, Pa.) with three openings and permanently bonded to glass slides with a thermocycling-resistant epoxy adhesive, EP21TDCHT (MasterBond, Inc., Hackensack N.J.). Covers that were compression molded of clear TPX in an aluminum mold, were then snapped into the openings over one or more specimen areas of microscope slides to form a chamber having differing heights, as defined by the sloping features on the cover's projection. The rim of the covers were castellated to fit groves machined into the PEEK rim around the openings in order to strengthen the snap fit between the two parts. A liquid conformal coating of PSA529 (GE Silicones, Waterford, N.Y.) was applied to the cover rims. It remained tacky after drying and minimized the potential for leaks between the TPX cover and PEEK part during rapid thermocycling.

Technologies exist to dispense liquids by microdroplets from different reservoirs through dedicated lines to precise X-Y-Z locations. Newer, automated liquid handling systems under microprocessor control are capable of dispensing microdroplets, either individually or in a pulsed, jet-like stream, in a non-contact mode and the term non-contact dispense has been adopted to describe this type of dispenser. They are much faster than systems requiring contact with either the side wall of, or liquids in, an open well. For instance, as smaller, measured microvolumes are supplied, some dispensing technologies require that the dispensing probe touch the side of a well to knock off a hanging microdroplet to insure delivery. There are several advantages in having a fluid stream or droplet exit the dispensing probes without each dispensing probe touching the device. Each dispensing probe is kept clean and can retract any precious reagent left in a delivery line and easily store it for future use. No disposable pipette tip or cleaning station is needed for dispensing probes.

Evaporation becomes a more significant problem with smaller volumes in open wells because the liquid is exposed to a larger surface area relative to volume. For this reason, it is desirable to have a covered chamber for reactions in which the liquid volume of the chamber, but not the working surface area, is reduced. Up until the invention herein, dispensing to very thin chambers was accomplished by contact dispensing with either positive pressure applied at the entry or negative pressure at the exit. The design of the invention causes liquids to flow into a thin chamber by capillary attraction, thereby eliminating both the use of pressure or vacuum to fill it and eliminating the need for physical contact between the fluid dispenser and the device. Embodiments of the invention are the first thin reaction chambers capable of uniformly filling with liquids by non-contact dispensing.

The entry and exit ports embodied in the invention expose relatively little area of the liquid to evaporative loss. As required by the nature of the reaction, ports may be opened and closed, or not. During high temperature incubations, the entry port 20 and exit port 30 port are closed by seals (not shown). Preferably, the seal for the entry port 20 is shaped to fit the liquid receiving area 18 or closed in such a way that minimizes the volume of air entrapped in the liquid receiving area 18 upon closure because entrapped air will expand into the chamber 16 when heated and when the air contracts upon cooling, it can act to pump liquid out of the chamber 16. Pinching means is yet another way to close ports wherein the chamber walls around the port are pliable or movable and pressure is applied to squeeze or turn the port openings into a closed position, as in the example of a pinchcock. In embodiments with closures to the entry port 20 and exit port 30, means to secure seals may be adhesives, clamping, air pressure and the like.

Alternate embodiments are valve closures that are located in the vicinity of the ports of the device, either externally-actuated or self-actuated. The valves would not obstruct capillary fluid flow in a normally open position. One actuating mechanism for opening and closing the ports are sensors recognizing the temperature of the reaction chamber device to actuate one or more valves. When below a selected temperature, the valves are in normally open positions and allow fluid movement. When the reaction chamber 16 is incubated at temperatures above the selected temperature, the valves are actuated to close. Since vapor pressure increases dramatically as temperatures approach the boiling point of the aqueous reagents, increased vapor pressure is also a means to actuate a valve and close a port.

Yet another embodiment to close the reaction chamber ports during either temperature incubation at a selected temperature, or during rapid temperature cycling, is an inflatable valve made of flexible material with an internal space containing liquid and gas that will expand their internal space during heating. The vapor pressure of aqueous fluids increases rapidly within the confined space as temperature approaches the boiling point of water and supplies an internal force to deflect the inflated valve body into a fluid sealing engagement with a port. As the valves inflate, they obstruct the ports because of the manner in which they are positioned. The valves are therefore self-actuated by the same heat source that is increasing reaction chamber temperature. For reactions using temperature to denature nucleic acids, a temperature in the range of 90 C. and above is attained. The kind and ratio of liquid and gas inside the valve are calibrated to inflate at a selected temperature that is below a temperature sufficient to denature nucleic acids in order that the ports are in a closed position before vapor pressure rapidly accelerates the rate of evaporation. The normally closed valve position corresponds therefore to a predetermined temperature that is in a temperature range somewhat lower than the temperature to which reaction chamber fluids are incubated, or rapidly thermocycled.

Alternately, the valves may be actuated by mechanisms other than those involving temperature change. Yet another mechanism for opening and closing valves may be electromagnetic, in which magnetized material is incorporated into the valve body and actuated by discrete electromagnetic fields to move a valve that is in a normally open position to closed position. It is clear that resistant heating is possible in the reaction chamber formed by the invention by doping, or by depositing conductive coatings on, one or more chamber walls and applying electrical current.

A thin chamber is more easily fabricated in two, or more, parts made of either similar or dissimilar materials, with each part generally contributing at least one of the chamber's two planar working surfaces, wherein one or more of the reactants may, or may not, be immobilized on the working surface area of one or more parts, which parts are joined together to form the chamber thereof. In any particular product, any one or more of the aforementioned features may be present in an embodiment. Since micromachining methods are more economical when many parts are fabricated close together, parts of the invention that are micromachined may be cut and repackaged in a supporting structure to accommodate the requirements of different fluid dispensing systems, whether manual or automated, or different types of instrumented signal analysis and interpretation. Any one of the semi-conductor manufacturing techniques, such as known in the making of ultrafine features for injection molds and silicon microchips, depositing materials on silicon to build micro-structures or lithography electroplating (LIGA), may be used to make the device of the invention. The same semiconductor manufacturing techniques may be used to fabricate electrodes for resistive heating, sensing temperature, and conducting chemical or electrical current, any and all of which may be part of feedback and process control or engaged in the detection of particular biomolecules or labels thereon. The chamber may include any number of devices such as valves that open and close ports, or pumps that create a wave or current within the fluids to move biomolecules such as nucleic acids. Valves may be micromachined as part of the reaction chamber. Alternately, the valves may be manufactured separately and assembled into reaction chambers. Microchambers are configured and packaged with optical or electrical interfaces to a microprocessor for individual process control. The microprocessor or controller may reside in an instrument that also provides reagent dispensing to each reaction chamber. The invention may itself comprise an assembly that supports multiple, biochemical processing techniques and enables analysis of specific sequences of the nucleic acids present in biological samples, either generating a signal visible to the naked eye or a reading displayed when inserted into an instrumented device.

The chamber embodied in this invention is well-suited for positioning an array because a microprobe array is readily bonded, synthesized or printed on a microscope slide or silicon chip, which surface becomes one of the opposing walls of the chamber when it is affixed to the opposing wall comprising the means to control fluid flow. Optically clear walls of glass, clear polymer or the like, permit imaging with scanners and CCD cameras though the wall. Electronic circuits may be printed on glass, silicon or other material to connect each specific probe with a signal-detecting instrument. By affixing the device of the invention with a wall containing a probe array on its surface, such as could be made by light-directed chemical synthesis (Affymetrix, Santa Clara, Calif.) or other means of binding nucleic acid sequences to a surface, the device is capable of processing samples with different liquid treatments such as needed for labeling and hybridizing nucleic acid samples. An optically clear wall or window of the device such as glass or clear plastic makes it compatible to be read by a CCD camera imaging system, or other dedicated instruments and software developed to detect fluorescence of high-density arrays of oligonucleotides.

The device of the invention has working areas coated with reactants and therefore is suitable for preparing a micro-sample of a few specimen cells, amplifying, releasing or labeling targets nucleic acid sequences of the specimen to hybridize with an oligo probe array on another coated working area, for visual or instrumented detection. It is envisioned that blood or other specimens may be immobilized by drying onto a portion of the surface of the device for analyzing nucleic acids present. The aforementioned, channel feature comprised of a fibrous matrix having interfacing capillary spaces is capable of drawing blood samples and the like into the thin spaces of the chamber apparatus. In other copending patents and patent application, we demonstrate drying whole blood and other types of biological specimen onto surfaces or fibrous matrices where components are immobilized and analyzed without extracting or purifying the components. A working surface area could be coated with a biomolecular monolayer enhancing or protecting an underlying surface probe array. Examples of activating reactants are antibodies or enzymes that would cause disassociation or exposure. A chamber's working area can be shaped to accommodate different probe array patterns, as may be arranged in one or more linear or curved rows. A reaction chamber may comprise more than one compartment such that a component of a biological sample is moved into a separate compartment to make contact with the microprobe array. The advantages of consolidating steps into a single device is that it is cost effective, no sample transfer step is required, eliminating sample mix-up, and maintaining a closed system further avoids molecular contamination during processing and reading.

What is claimed is:

1. An apparatus for handling liquids in a thin capillary space, comprising
   (a) two opposing walls forming a thin capillary space;
   (b) at least one feature projecting from a wall into the thin capillary space to create regions of capillarity stronger than other regions;
   (c) a liquid receiving area in fluid communication with the thin capillary space; and
       wherein the liquids from the liquid receiving area fill the thin capillary space in a predictable manner under the control of differential capillarities.

2. The apparatus according to claim 1, wherein the projecting feature forms a channel between the two opposing walls, in which channel there is a strong capillary liquid attraction; wherein said channel directs the flow of liquids from said liquid receiving area into the thin space.

3. The apparatus according to claim 1, wherein one or more projecting features comprises a base and an apex, said projecting features defining differential capillarites between said the two opposing walls; and wherein liquids flow into and preferentially fill the region of thin capillary space between the two opposing walls.

4. The apparatus according to claim 3, further comprising an annular enclosure surrounding and in fluid communication with the thin capillary space; said annular enclosure having a weaker liquid attraction than the thin capillary space; whereupon bubbles arising in a liquid residing in said thin capillary space move into said annular enclosure.

5. The apparatus according to claim 1, further comprising a fibrous matrix feature projecting from at least one of said two opposing walls and forming interfacing capillary channels between the two opposing walls, said capillary channels having a strong capillary attraction; wherein said interfacing capillary channels draw liquid from the liquid receiving area into said apparatus and direct the flow of liquids into said thin space.

6. The apparatus according to claim 1, further comprising materials for the purpose of reacting and analyzing components of biological specimens which are selected from the group consisting of liquids which are biological specimens, liquids which contain biological specimens and solid biological specimens.

7. An apparatus for holding liquids in a thin capillary space, comprising a wall forming a thin space with respect to the plane of another wall positioned opposite said apparatus; wherein said wall of the apparatus has features creating differential capillarities in the thin space when said wall of apparatus is positioned opposite another wall; wherein liquids in the the thin capillary space flow in a predictable manner under the control of said differential capillarities.

8. The apparatus according to claim 7, further comprising a feature projecting from said wall into the thin space, said feature forming a channel between said wall of apparatus and another wall positioned opposite it; in which channel there is a strong capillary liquid attraction; wherein said channel directs the flow of liquids from said liquid receiving area into the thin space.

9. The apparatus according to claim 7, further comprising a sloped feature having a base and an apex and projecting from the surface of said wall, said sloped feature gradually increasing in height from the base towards the apex, said sloped feature defining a thin capillary space when positioned opposite another wall; wherein said thin capillary space has regions between the apex and the base of said sloped feature, said regions progressively decreasing in height from the base of the sloped feature toward the apex; and wherein liquids flow into and fill in preference the region of the thin capillary space near the apex of said sloped feature and then fill progressively regions towards the base of the sloped feature.

10. The apparatus according to claim 9, further comprising an annular enclosure surrounding and in fluid communication with said thin capillary space defined by said sloped feature when apparatus is positioned opposite another wall; wherein said annular enclosure has cross-sectional distances providing a weaker capillary liquid attraction than the adjoining region of thin capillary space; wherein liquids flow into and preferentially fill the regions of the thin capillary space and then progressively fill said annular enclosure; and wherein bubbles arising in liquid residing in said thin capillary space defined by said sloped feature move into the annular enclosure.

11. The apparatus according to claim 7, further comprising a matrix feature on said wall of apparatus forming interfacing capillary channels in fluid communication with the liquid receiving area and the thin space between the wall of the apparatus and the plane of an opposing wall, said capillary channels having a strong capillary attraction; wherein said interfacing capillary channels draw liquid from the liquid receiving area into said apparatus and direct the flow of liquids into the thin space when the apparatus is positioned opposite another wall.

12. The apparatus according to claim 7, further comprising materials which are selected from the group consisting of, but not limited to, microprobe arrays for the purpose of reacting and analyzing components of biological specimens.

13. A process for handling liquids in a thin space for analyzing a sample, comprising:
   (a) providing a thin space between two opposing walls, said two opposing walls having features made by a method selected from a group consisting of, but not limited to, molding and micromachining and forming a thin space having regions of stronger capillary liquid attraction between the two opposing walls than other regions;
   (b) providing a liquid receiving area in fluid communication with said thin space between said two opposing walls;
   (c) dispensing a liquid drop to said liquid receiving area; wherein the liquid drop fills the regions of weaker and stronger capillary liquid attractions predictably.

14. The process according to claim 13, further comprising:
- (a) providing one or more coatings on a surface of the apparatus, said coatings selected from a group consisting of, but not limited to, a microprobe array;
- (b) adding and reacting liquids with one or more said coatings;
  wherein the surface having one or more said coatings is preferentially covered with said liquids.

15. The process according to claim 13, further comprising:
- (a) enclosing said thin space with side walls so that a thin chamber is formed;
- (b) providing an entry port and an exit port in fluid communication with said thin space;
- (c) providing a channel from the entry port into the thin space, said channel having a stronger capillary liquid attraction than the region of the space where the two opposing walls are the first distance apart;
  wherein capillary attraction draws liquids into the channel prior to filling the region of the space where the two opposing walls are the first distance apart.

16. The process according to claim 13, wherein the height of the thin space between said two opposing walls gradually increases from the first distance to the second distance; wherein the region of the space at the first distance has the strongest capillary liquid attraction between the two opposing walls and capillary liquid attraction decreases towards the region of the space at the second distance, further comprising providing an annular space surrounding and in fluid communication with the thin space, said annular space having a cross-sectional height and width so that the annular space provides a weaker capillary attraction than the thin space; wherein the stronger capillary liquid attraction draws liquids from the liquid receiving area into and fills the thin space without bubbles first and in preference to said annular space.

17. The process according to claim 15, wherein a liquid is residing in the channel and in the thin space, further comprising:
- (a) providing a liquid removing device;
- (b) making liquid communication between the liquid removing device and the liquid residing in the channel through the entry port;
  wherein the liquid removing device withdraws liquid from the channel first and the liquid flows out of the thin space between the two opposing walls through the channel until the thin space is empty.

18. The process according to claim 15, wherein a liquid removing device is provided, further comprising:
- (a) providing one or more coatings on the surface of at least one of the two opposing walls;
- (b) providing a first liquid in the thin space between two opposing walls in liquid communication with said one or more coatings;
- (c) adding a second liquid in the liquid receiving area;
- (d) withdrawing the first liquid from the thin space between the two opposing walls with the liquid removing device through the exit port;
- (e) repeating steps (c) and (d) until the first liquid reacting with one or more coatings on said surface is effectively replaced by the second liquid;
  wherein the second liquid in the liquid receiving area enters the region of the thin space between two opposing walls and becomes mixed with and progressively dilutes the first liquid in the thin space with each repeated addition of the second liquid; until the liquid in liquid communication with said one or more coatings is effectively changed.

19. The process according to claim 15; further comprising;
- (a) filling said thin chamber with a first liquid;
- (b) closing entry and exit ports with sealing means; and
- (c) increasing the temperature of the liquid residing in said thin chamber;
  wherein air bubbles evacuate from said liquid residing in the thin space between two opposing walls having a stronger capillary attraction in preference to said thin space having a weaker capillary attraction.

20. The process according to claim 18, wherein gravitational drip replaces providing a liquid removing device, further comprising providing an exit port where a first liquid remains in the thin space by capillary attraction until liquid in the liquid receiving area 18 forms a pressure head causing liquid in the thin space to form a hanging drop from the exit port 30, overcome surface tension and fall as a drop; wherein liquids dripping toward a gravitational attraction replaces withdrawing liquid with a liquid removing device in (d).

* * * * *